May 11, 1965  S. BENNON  3,183,460
ELECTRICAL INDUCTIVE APPARATUS HAVING COOLANT
DUCTS IN INSULATION
Filed July 28, 1960  2 Sheets-Sheet 1

INVENTOR
Saul Bennon
BY
Clement L. McHale
ATTORNEY

United States Patent Office 3,183,460
Patented May 11, 1965

3,183,460
ELECTRICAL INDUCTIVE APPARATUS HAVING COOLANT DUCTS IN INSULATION
Saul Bennon, Sharon, Pa., assignor to Westinghouse Electric Corporation, East Pittsburgh, Pa., a corporation of Pennsylvania
Filed July 28, 1960, Ser. No. 45,962
15 Claims. (Cl. 336—57)

This invention relates to stationary electrical inductive apparatus, such as transformers or reactors, and more particularly to winding and insulation structures for such apparatus.

In certain types of conventional electrical inductive apparatus, such as transformers, a winding including a plurality of coils spaced apart from one another is disposed on a magnetic core structure which is immersed in a dielectric fluid or cooling medium. In order to carry off or dissipate the heat which results during the operation of inductive apparatus of the latter type, it has been common practice to provide cooling ducts or passageways which are disposed to pass through the insulation between the coils or between the windings of such apparatus to permit the flow of a cooling medium or dielectric fluid therethrough. In a construction of the latter type, sufficient separation must be provided between the coils and between the windings of inductive apparatus of the type described to prevent over-stressing the fluid dielectric which flows through the cooling ducts or passageways when a high potential is applied to one of the windings of such apparatus since it is well known that the voltage stress varies inversely with the specific inductive capacitance or dielectric constant of the respective dielectric materials in a composite insulation structure and the dielectric constant of a fluid dielectric is usually less than that of solid insulation alone or solid insulation at least partially permeated with a fluid dielectric.

In an improved winding construction which was recently developed, a winding is provided which comprises a plurality of coils disposed on an associated magnetic core structure and spaced apart from one another, each of said coils including a plurality of coil sections which are spaced apart from one another and connected in circuit relation so the potential difference between adjacent coil sections is either relatively low or negligible. The latter construction permits the introduction of cooling ducts or passageways internally in the spaces between the respective coil sections of each coil. The potential stress to which the fluid dielectric, which flows through the latter ducts, is subjected, is relatively low or negligible, while substantially solid insulation may be employed to substantially fill the spaces between the respective coils or windings in which the construction is utilized where the potential stress may be much greater. The latter construction has been employed with very satisfactory results in a great many applications to more efficiently utilize the insulation in the windings of transformers and to provide a more compact winding and insulation structure for such apparatus having lower operating losses. In order to substantially eliminate the possibility of voids or pockets in the solid insulation between the respective coils and windings in a construction of the latter type, other construction improvements have been developed for fitting and arranging the pieces of solid insulation between and around the associated coils and windings. At the higher operating potentials or voltages of transmission systems in which transformers are increasingly applied, it has been found that in the use of a winding construction of the type just described, in which substantially solid insulation is provided between the respective coils and windings, certain cooling problems may be introduced in certain applications due to the increased dielectric losses in the solid insulation and the heat which results therefrom during the operation of the transformers. It is, therefore, desirable to provide an improved winding construction which possesses all of the advantages of the winding construction just described and which provides several additional advantages in certain applications, such as improved cooling of the insulation between the respective coils and windings and a reduction in the maximum voltage stress to which the latter insulation is subjected during the operation of the apparatus in which it is incorporated.

It is an object of this invention to provide a new and improved winding and insulation construction for stationary electrical inductive apparatus, such as transformers or reactors.

Another object of this invention is to provide an improved cooling arrangement for electrical inductive apparatus, such as transformers, which are subjected to high potentials during operation.

A further object of this invention is to provide an improved construction for reducing the maximum voltage stress to which the insulation is subjected during the operation of electrical inductive apparatus, such as transformers.

Other objects of the invention will, in part, be obvious and will in part, appear hereinafter.

The invention accordingly comprises the features of construction, combination of elements and arrangement of parts, which will be exemplified in the construction hereinafter set forth, and the scope of the application of which will be indicated in the claims.

For a fuller understanding of the nature and objects of the invention, reference should be had to the following detailed description, taken in connection with the accompanying drawings in which.

Figure 3:
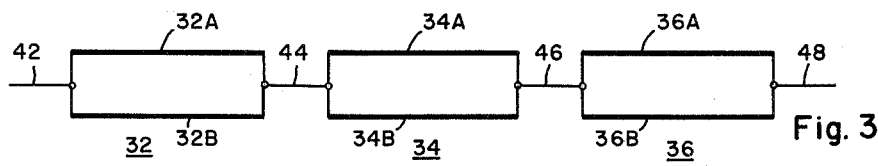
Figure 4:
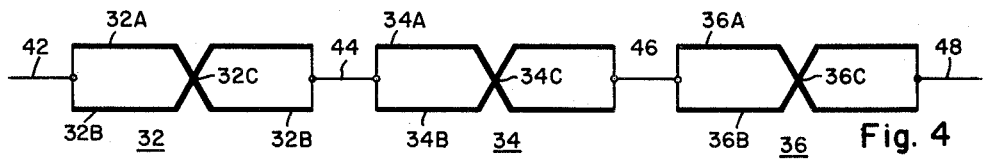

FIGS. 3 and 4 are diagrammatical representations of a portion of the windings of the transformer shown in FIGS. 1 and 2, and FIGS. 5 and 6 are partial views in section of portions of transformer windings demonstrating additional embodiments of the invention.

Figure 1:
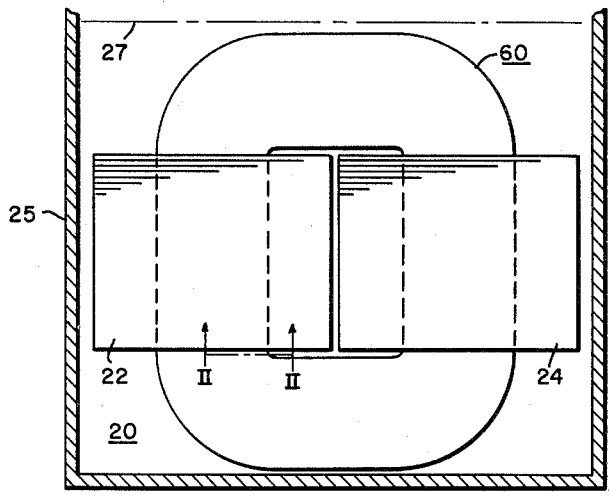
FIG. 1 is a view partly in section and partly in side elevation of a portion of a transformer embodying the features of the invention.
Figure 2:
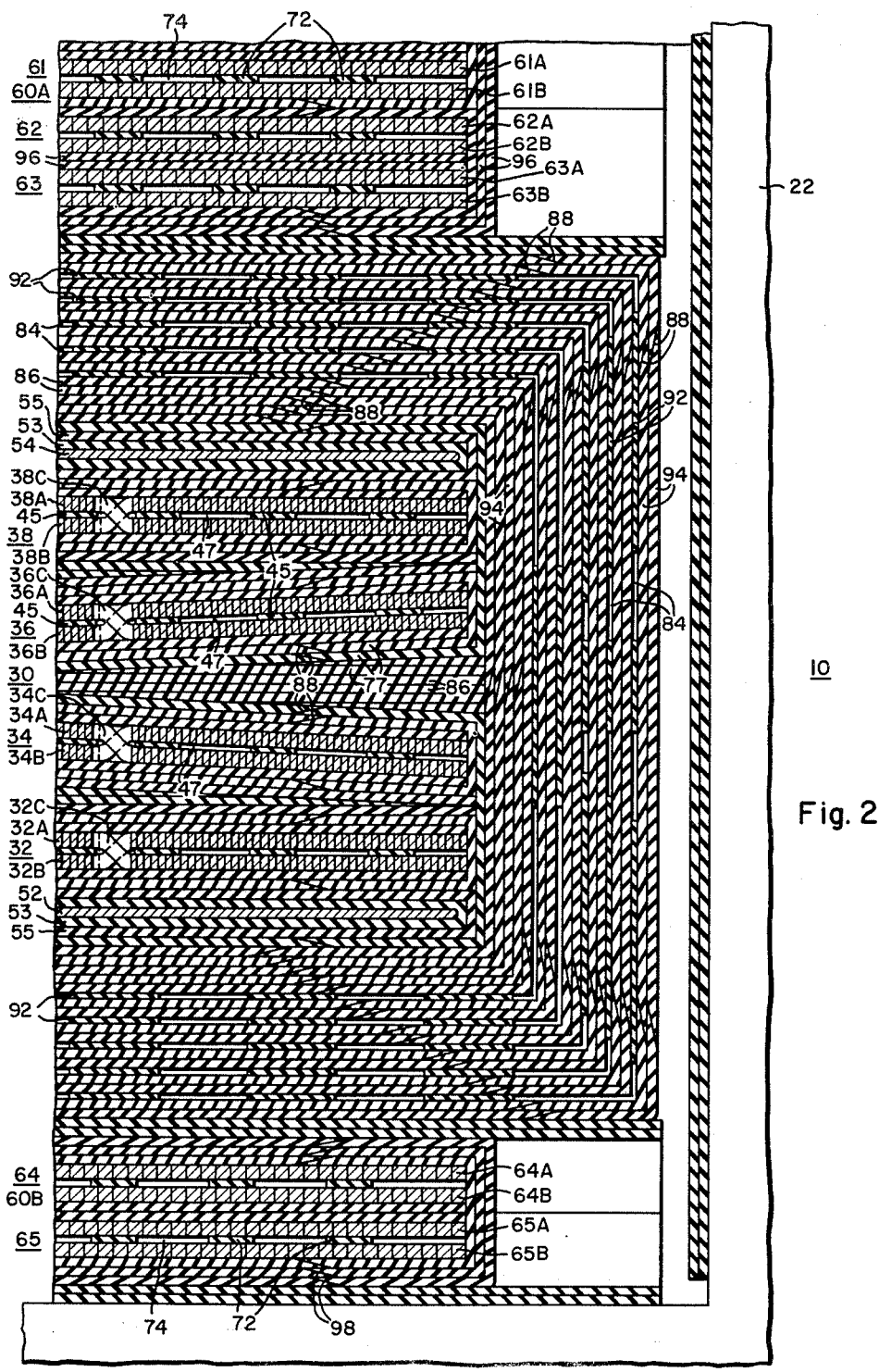
FIG. 2 is a view taken along the line II—II of FIG. 1.

Referring now to the drawings in FIGS. 1 and 2 in particular, there is illustrated a transformer 10 of the shell form type which comprises a core and coil assembly 20 disposed in an associated casing or tank 25 and substantially immersed in cooling medium or fluid dielectric, such as an insulating oil, whose level is indicated generally at 27. The core and coil assembly 20 includes the magnetic core members 22 and 24, which when assembled form a magnetic core structure of the shell form type, the primary or high voltage winding 30 and the secondary or low voltage winding 60 which are disposed in inductive relationship with one another on the associated magnetic core members 22 and 24. The secondary or low voltage winding 60 includes the first and second winding sections 60A and 60B, respectively which are disposed on opposite sides of the primary or high voltage winding 30 in what may be described as an interleaved arrangement, as best shown in FIG. 2.

More specifically, the primary or high voltage winding 30 comprises a plurality of pancake type or disc type coils or winding sections 32, 34, 36 and 38 which are disposed generally in side-by-side relation with respect to one another on the magnetic core members 22 and 24 and spaced apart from one another, as best shown in FIG. 2. Each of the coils 32, 34, 36 and 38 includes a plurality of layers of spirally wound conductors or conductor turns which are disposed substantially parallel with respect to one another or in side-by-side relationship with respect to one another and spaced apart to form the cooling ducts or passageways 47 therebetween to permit the flow of the cooling medium or fluid dielectric 27 therethrough in close contact with said conductor layers. In this instance, each of the coils 32, 34, 36 and 38 is illustrated for the sake of convenience as including only two conductor layers, although it is to be understood that in certain applications, the number of conductor layers may be increased as required to provide the necessary current handling capacity or rating in the winding 30. For example, the coil 32 includes the first and second conductor layers 32A and 32B, while the coils 34, 36 and 38 include the first and second conductor layers 34A and 34B, 36A and 36B, and 38A and 38B, respectively, as shown in FIG. 2.

Referring to FIG. 3, the coils 32, 34 and 36 of the winding 30 are represented diagrammatically. As shown in FIG. 3, the conductor layers or coil sections which make up each of the coils 32, 34, 36 and 38 are connected in parallel circuit relationship with one another so that the potential difference between the adjacent conductor layers or coil sections in each of said coils is either relatively low or negligible and the corresponding potential stress to which the fluid dielectric, which flows through the cooling ducts or passageways 47, is subjected, is also relatively low or negligible. In order to maintain the spacing between the conductor layers or coil sections which make up each of the coils 32, 34, 36 and 38 and to ensure the flow of a cooling medium or fluid dielectric 27 through the cooling passageways 47, a plurality of spacers or duct formers 45 are provided between the conductor layers which make up each of the coils 32, 34, 36 and 38. The spacers 45 in each of the coils 32, 34, 36 and 38 all lie in a substantially vertical plane so that the cooling medium or dielectric fluid 27 disposed in the cooling ducts 47 flows naturally therethrough by means of convection through said coils whenever a thermal head exists in the core and coil assembly 20 of the transformer 10. The solid insulation from which the spacers or duct formers 45 are formed may be of the cellulosic type, such as pressboard. In order to reduce the circulating currents in each of the coils 32, 34, 36 and 38 due to leakage magnetic flux when current flows in the winding 30 and the corresponding losses which result therefrom, each of the coils 32, 34, 36 and 38 may have their conductor layers transposed approximately midway during the winding of the conductor turns, as indicated in section in FIG. 2 and as indicated diagrammatically in FIG. 4 at 32C through 38C, respectively.

Referring again to FIGS. 3 and 4, the coils 32, 34, 36 and 38 which make up the high voltage winding 30 are connected in series circuit relationship with one another by the interconnecting conductors 44, 46 and 48, respectively, while the conductor 42 shown at the left end of the coil 32 in FIGS. 3 and 4 may be considered as the line conductor which would typically be connected to a transmission line or other high potential source of alternating current in a transmission system. It is to be noted in FIG. 2 that the inner and outer ends or sides of the coils 32, 34, 36 and 38 are alternately disposed either closer together or farther apart depending upon whether the adjacent ends of sides of the respective coils are connected in circuit relationship with one another, as indicated diagrammatically in FIGS. 3 and 4. When the adjacent ends or sides of the respective coils are connected in circuit relation with one another, the potential difference which exists between the adjacent portions of the respective coils is relatively low and therefore, the adjacent ends or sides of the coils thus connected may be disposed closer together while the unconnected ends or sides of the adjacent coils are disposed farther apart because of the greater potential difference existing between the adjacent portions of such coils.

In order to properly insulate the coils 32, 34, 36 and 32 of the high voltage winding 30 from one another, the space between said coils and immediately around said coils is substantially filled with solid insulation which is disposed to substantially eliminate the possibility of any voids or pockets in the insulation around and between said coils. In this instance, the solid insulation between and around the coils 32, 34, 36 and 38 of the high voltage winding 30 comprises a plurality of layers or sheets of a suitable solid insulating material which may be of the cellulosic type, such as pressboard, which are cut and fitted around the associated coils to substantially fill the space therebetween. In particular, the pieces of the sheet insulation 86 disposed between and around the coils 32, 34, 36 and 38 immediately adjacent to said coils are cut to conform to the shape of the associated coils as illustrated in FIG. 1 while additional L-shaped and U-shaped pieces of the sheet or layer insulation 86 are fitted around the sides or ends of the associated coils, as best shown in FIG. 2. The meeting ends of the pieces of the sheet insulation 86 which make up the solid insulation between and around the coils 32, 34, 36 and 38 are scarfed, beveled or oppositely tapered to substantially eliminate the possibility of voids or pockets in the insulation between and around said coils when the different pieces of insulation are assembled or fitted during the manufacture of the core and coil assembly 20. It is to be noted that the solid insulation between and around the coils 32, 34, 36 and 38 of the high voltage winding 30 may be at least partially permeated or impregnated with the fluid dielectric or cooling medium 27 in a particular application. The absence of voids or pockets in the solid insulation between and around the coils 32, 34, 36 and 38 which are normally filled with the associated fluid dielectric or cooling medium 27 in older types of winding constructions, substantially eliminates the possibility of an insulation failure due to the forming of corona in such voids or pockets after the transformer 10 is put into operation and a high potential is applied to the high voltage winding 30.

In order to improve the distribution of surge voltages throughout the high voltage winding 30 when such abnormal voltages are applied to the high voltage winding 30, the static plates 52 and 54 are disposed at the opposite ends of the high voltage winding 30 adjacent to the coils 32 and 38, respectively, as best shown in FIG. 2. Each of the static plates 52 and 54 may be formed from a conducting sheet material, such as a metal, and shaped to conform to the shape of the associated coils 32 and 38, respectively. In order to insulate the static plates 52 and 54 from the associated high voltage coils 32, 34, 36 and 38, the insulating pieces or washer members 53 may be disposed on opposite sides of each of said static plates and may be formed from a solid insulating material which may be of the cellulosic type, such as pressboard. In addition, to prevent the concentration of voltage stresses adjacent the edges or ends of the static plates 52 and 54, the insulating layer 55 which is formed from a suitable material having a high resistivity, such as Coronox tape, may be wound around the static plates 52 and 54 and their associated insulating washer members 53, as best illustrated in FIG. 2.

In this instance, the low voltage or secondary winding 60 comprises a first low voltage winding section 60A which comprises the low voltage coils 61, 62 and 63 and a second low voltage winding section 60B which comprises the low voltage coils 64 and 65. As illustrated, the low voltage coils 61 through 65 are similar to the high voltage coils 32, 34, 36 and 38, previously described. In particular, the low voltage coils 61 through 65 are disposed in spaced relationship with respect to one another on the associated magnetic core members 22 and 24 and may also be connected in series circuit relationship similarly to the coils 32, 34, 36, and 38 of the high voltage winding 30, as previously described and shown diagrammatically in FIGS. 3 and 4. Each of the low voltage coils 61 through 65 comprises a plurality of layers of spirally wound conductor turns which are spaced apart from one another to form the cooling ducts or passageways 74 therebetween. The spacing between the conductor layers which make up each of the coils 61 through 65 is similarly maintained by a plurality of spacers or duct formers 72 which are also disposed in a vertical plane to permit the flow of a fluid dielectric therethrough by means of convection, said fluid dielectric passing in close contact with the conductor layers which make up each of the coils 61 through 65 to provide efficient cooling or dissipation of the heat which results during the operation thereof. For example, the coil 61 comprises the layers of spirally wound conductor turns 61A and 61B, while each of the coils 62 through 65 is also illustrated as comprising two layers of spirally wound conductor turns 62A and 62B, 63A and 63B, 64A and 64B, and 65A and 65B, respectively. The conductor layers which make up each of the coils 61 through 65 are connected in parallel circuit relation with one another similarly to the high voltage coils 32, 34, 36 and 38, shown diagrammatically in FIGS. 3 and 4, so that the potential difference which exists between the conductor layers which make up each of said coils is relatively low or negligible and the corresponding potential stress applied to the fluid dielectric which flows through the cooling ducts 74 is also relatively low or negligible.

In order to insulate the low voltage coils 61 through 65 from one another and from the magnetic core members 22 and 24, the space between and around each of the low voltage coils 61 through 65 is substantially filled with solid insulation which may be of the cellulosic type, such as pressboard, similarly to the high voltage winding 30. The solid insulation between and around the low voltage coils 61 through 65 may be provided in the form of a sheet or layer insulation 96 which is cut and fitted around the low voltage coils 61 through 65, as best shown in FIG. 2, to substantially eliminate the possibility of any voids or pockets in the solid insulation disposed between and around said coils. The insulation pieces which are disposed between and around the low voltage coils 61 through 65 may be shaped to conform to the shape of the associated low voltage coils, similarly to the insulation disposed around the high voltage coils 32, 34, 36 and 38, and additional L-shaped and U-shaped pieces may be fitted around the low voltage coils 61 through 65 with the meeting ends of said insulation pieces scarfed, beveled or oppositely tapered as indicated generally at 98 to substantially eliminate the possibility of any voids or pockets in the latter insulation between and around said coils. It is to be understood that in certain applications that the low voltage winding may be of certain conventional types which do not include internally disposed ducts in the coils thereof and having substantially solid insulation disposed between the coils thereof as do the coils 61 through 65. It is to be understood that additional conductor layers may be provided in the coils 61 through 65 which make up the low voltage winding 61 as required in a particular application to provide the necessary current carrying capacity or rating. It is to be noted that the use of parallel connected conductor layers in both the low voltage winding 60 and the high voltage winding 30 substantially reduces the eddy current losses which would otherwise result if only a single conductor layer were provided to handle a particular current rating or capacity.

In order to insulate the high voltage winding 30 from each of the winding sections 60A and 60B of the low voltage winding 60 and to insulate both the high voltage winding 30 and the low voltage winding 60 from the magnetic core members 22 and 24 and the casing 25 which are normally grounded, a plurality of layers of substantially solid insulation 94 are disposed in the space between the high voltage winding 30 and each of the low voltage winding sections 60A and 60B and between both the high voltage winding 30 and the low voltage winding 60 and the magnetic core members 22 and 24, as best shown in FIG. 2. The meeting ends of the sheet or layer insulation 94 which may be of a cellulosic type, such as pressboard, may be scarfed, beveled or oppositely tapered to substantially eliminate any voids or pockets between the meeting ends of the straight or L-shaped pieces of the solid insulation 94 as indicated generally at 88 in FIG. 2. Since the voltage or potential stress in the space between the high voltage winding 30 and the low voltage winding sections 60A and 60B and in the space between the high voltage winding 30 and the core members 22 and 24 is not uniform as you travel outwardly from the edges or corners of the high voltage coils 32 through 38, but instead is highest immediately adjacent to the edges and corners of said high voltage coils and decreases as you travel away from said high voltage coils toward either of the low voltage winding sections 60A and 60B or toward the magnetic core members 22 and 24, substantially solid insulation is disposed in said space immediately adjacent to said high voltage coils as best shown in FIG. 2. In particular, a plurality of layers or sheets of the solid insulation 94 is disposed immediately adjacent to or around the high voltage winding 30 with the meeting ends scarfed or beveled as indicated at 88 and without any cooling ducts or passages therethrough in which any fluid dielectric would be subjected to the highest potential or voltage stresses adjacent to the edges or corners of the high voltage coils 32, 34, 36 and 38. In the areas or regions of lower voltage or potential stress in the space between the high voltage winding 30 and the low voltage winding sections 60A and 60B and in the space between the high voltage winding 30 and the magnetic core members 22 and 24, a plurality of layers or sheets of the solid insulation 94 are alternately disposed between the relatively thin cooling ducts or passageways 84 which permit the flow of a fluid dielectric therethrough to carry off or dissipate the heat which results from dielectric heating or losses in the solid insulation 94 when very high operating potentials are applied to the high voltage winding 30 and the electric field concentration in the space between the high voltage winding 30 and the low voltage winding setcions 60A and 60B or between the high voltage winding 30 and the magnetic core members 22 and 24 is relatively high. The spacing between the alternate layers of solid insulation 94 is maintained by the spacers or duct formers 92 which are also disposed in a substantially vertical plane to ensure the flow of the fluid dielectric naturally by convection through the ducts 84 whenever a thermal head is present in the solid insulation 94 in the space between the high voltage winding sections 60A and 60B or the magnetic core sections 22 and 24.

In addition to providing improved cooling of the solid insulation 94 in the space between the high voltage winding 30 and either of the low voltage winding sections 60A and 60B or the magnetic core members 22 and 24, the presence of the dielectric fluid in the cooling ducts 84 in the areas or regions of lower voltage stress in the latter space also serves to reduce the maximum voltage or potential stress in said space since the specific inductive capacitance of a typical fluid dielectric, such as an insulating oil, is normally less than the specific inductive capacitance of a typical solid insulation 94, such as pressboard and since the potential stress in a composite insulation structure distributes itself inversely in accordance with the dielectric constants of the different insulating materials which make up the composite structure, as previously mentioned. The areas or regions in which the cooling ducts 84 are disposed, therefore, tend to make up a greater share of the voltage or potential stress in the space just described and to reduce the maximum potential or voltage stress in said space to provide a more uniform distribution of the voltage stress in the space between the high voltage winding 30 and either of the low voltage winding sections 60A and 60B or the magnetic core members 22 and 24. A plurality of alternate layers of the solid insulation 94 and the relatively thin ducts 84 are preferred in the areas or regions of lower potential stress since the fluid dielectric disposed in said ducts will normally have a greater volts per inch dielectric strength than if the thickness of the ducts 82 were greater. Particularly good results have been obtained by limiting the thickness of the ducts 84 to a range of approximately 1/16 of an inch to 1/2 inch. It is to be understood that the thicknesses of the ducts 84 may be varied with the variation of potential stress as you travel outwardly from the high voltage coils toward either of the low voltage winding sections 60A and 60B or toward the magnetic core members 22 and 24. It is to be understood that the meeting ends of the pieces of solid insulation 94 which make up the alternate layers of solid insulation between the ducts 84 need not be scarfed or beveled in a particular application to eliminate voids or pockets in the solid insulation 94 due to the presence of the ducts 84 and the fluid dielectric 27 which will normally fill such voids or pockets. The thicknesses of the various ducts 84 which are employed in a particular application will depend upon the potential stresses which are present in the different portions of the space between the high voltage winding 30 and either of the low voltage winding sections 60A and 60B or the magnetic core members 22 and 24 in order to limit the potential stress which is applied to the fluid dielectric in the ducts to a safe value below the corona level of said fluid dielectric. It is to be noted that if any minute voids or pockets should remain in the layers of solid insulation 94 immediately adjacent to the high voltage coils 32, 34, 36 and 38 after the fitting and assembly of said layers of solid insulation around said coils, the maximum voltage stress to which said voids or pockets, which are normally filled with the associated fluid dielectric, would be subjected is reduced by the presence of the cooling ducts 84 elsewhere in the insulation structure and the possibility of an insulation failure due to corona in said minute voids or pockets would be substantially reduced.

The presence of the oil ducts 84 in the space between the high voltage winding 30 and either the low voltage winding sections 60A and 60B or the magnetic core members 22 and 24 also permits a reduction in the dielectric losses and corresponding heating which occur in the solid insulation 94 during the operation of the transformer 10 since said ducts facilitate vacuum treating of the layers of solid insulation 94 to remove moisture therefrom. Any reduction in the slight moisture present in a solid insulation 94 results in a corresponding decrease in the dielectric losses which will be experienced during the operation of the transformer 10 when a relatively high alternating current operating potential is applied to the high voltage winding 30. The presence of the fluid dielectric in the cooling ducts 84 also serves to reduce the potential stress to which the fluid dielectric is subjected in the cooling ducts 47 inside the high voltage coils 32, 34, 36 and 38 whenever a surge voltage is impressed on the high voltage winding 30 and to reduce the maximum voltage or potential stresses which result from discontinuities wherever insulating materials of different types have different specific inductive capacitance are disposed adjacent to one another or meet one another throughout the high voltage winding 30 and in the insulation between said high voltage winding and either of the low voltage winding sections 60A and 60B or the magnetic core members 22 and 24. In other words, the voltage stress absorbed by the fluid dielectric disposed in the series or plurality of cooling ducts 84 is greater than if the insulation structure in the same areas or regions were substantially solid insulation to thereby reduce the maximum voltage or potential stress elsewhere in the space between the high voltage winding 30, adjacent to the edges or corners of the high voltage coils 32, 34 36 and 38, and the low voltage winding 60 or in the space between said high voltage winding and the magnetic cores 22 and 24. Although it is convenient to dispose the cooling ducts 84 in substantially parallel relationship in the construction shown in FIG. 2, it is to be understood that the latter relationship may be modified in a particular application to be other than a substantially parallel relationship where required. As previously pointed out, the solid insulation disposed throughout the different windings of the transformer 10 and between said windings and the magnetic core members 22 and 24 may be at least partially permeated or impregnated with a suitable fluid dielectric, such as an insulating oil.

Figure 5:
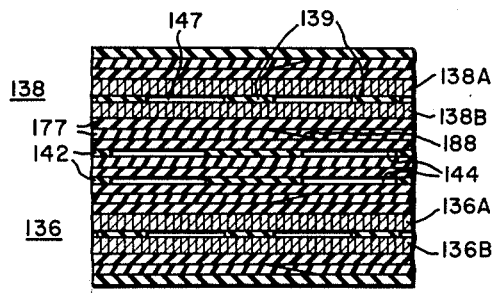
Figure 6:
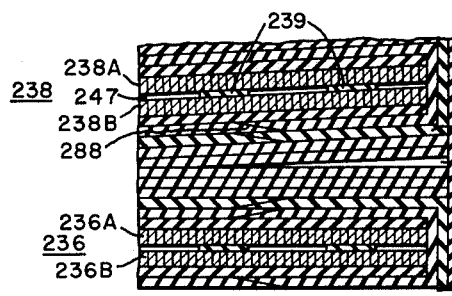

Referring now to FIGS. 5 and 6, there are illustrated alternative insulation constructions for high voltage windings of the type disclosed. Although the insulation between the coils 32, 34, 36 and 38 of the high voltage winding 30 in FIG. 2 is illustrated as being substantially solid insulation, it may be advisable at higher operating potentials to introduce cooling ducts in the solid insulation between the coils which make up a high voltage winding of the type disclosed. The latter cooling ducts would serve to both carry off or dissipate the heat which results from dielectric losses or heating in the solid insulation between the coils of a high voltage winding and also to reduce a maximum potential or voltage stress in the manner previously described for the transformer 10.

More specifically, referring to FIG. 5, the high voltage winding 100 is illustrated which is similar to the high voltage winding 30, previously described, and comprises a plurality of high voltage coils or winding sections 136 and 138 each having a plurality of layers of spirally wound conductor turns 136A and 136B and 138A and 138B, respectively. Each of the high voltage coils 136 and 138 includes an internally disposed cooling duct 147 which is provided between the substantially parallel conductor layers 136A and 136B and 138A and 138B, respectively. The spacing between the conductor layers in each of the coils 136 and 138 is maintained by the spacers or duct formers 139, similarly to the coils 32 through 38 of the high voltage winding 30, previously described. The high voltage coils 136 and 138 of the high voltage winding 100 would be disposed in spaced relation on an associated magnetic core (not shown) similarly to the high voltage winding 30, previously described. In order to insulate the high voltage coils 136 and 138 from one another and from any additional coils which may be employed in a particular application, the space between and around said high voltage coils includes a plurality of layers or sheets of solid insulation 177 with the meeting ends of the pieces of solid insulation 177 being scarfed beveled or oppositely tapered in the areas or regions immediately adjacent to the edges or corners of the associated high voltage coils, as indicated at 188 in FIG. 5, where the voltage or potential stress is highest as previously explained. In the areas or regions of lower potential or voltage stress between the high voltage coils 136 and 138 a plurality of alternate layers or sheets of the solid insulation 177 are disposed between the relatively thin cooling ducts or passageways 144 similarly to the cooling ducts 84, previously described. The spacing between the alternate layers of the sheet insulation 177 and the cooling ducts 144 is maintained by the spacers or duct formers 142, as shown in FIG. 5. The meeting ends of the alternate layers of solid insulation between the cooling ducts 144 need not be scarfed or beveled for the reasons previously mentioned in connection with the transformer 10. The advantages provided by the cooling ducts 144 would be the same as for the cooling ducts 84, previously mentioned. It is to be noted that the high voltage coils 136 and 138 are disposed in substantially parallel relationship, as illustrated in FIG. 5, but it is to be understood that the high voltage coils may be disposed closer together at the ends or sides where the successive high voltage coils are connected in series circuit relation and disposed farther apart from one another at the ends or sides of the high voltage coils where said coils are unconnected as shown for the winding 200 in FIG. 6 which also includes a plurality of high voltage coils 238 similar to those of the winding 100 shown in FIG. 5.

In particular, the winding 200 includes a plurality of high voltage coils 236 and 238 which are disposed in spaced relation on an associated magnetic core (not shown) similarly to the winding 30, previously described, each of said coils including a plurality of layers of spirally wound conductors which are spaced from one another to provide the cooling ducts 247 therebetween to permit the flow of a fluid dielectric in an internal path through said coils and which are connected in parallel circuit relation similarly to the coils of the winding 30, previously described, and the winding 100 just described. The space between the coils 236 and 238 includes a plurality of layers of solid insulation 277 in order to properly insulate said coils from one another and from any additional coils which may be provided in a particular application. The meeting ends of the layers of solid insulation 277 may be scarfed or beveled in a particular application as indicated at 288, while one or more cooling ducts 244 may be provided in the areas of lower voltage stress in the space between said coils as indicated in FIG. 6. In the areas of highest voltage stress between the coils 236 and 238 the layers of solid insulation 277 would be disposed without any cooling ducts or passageways and arranged to substantially avoid any voids or pockets which may be present in the areas or regions of highest voltage stress adjacent to the edges or corners of the high voltage coils 236 and 238. The thickness of the cooling duct 244 may be tapered in accordance with the variation of the potential stress in the area or region of lower voltage stress in which the cooling duct 244 is disposed in order to carry off or dissipate the dielectric losses or heating which result when a high potential is applied to the high voltage winding 200 and to reduce the maximum voltage stress present in the space between said high voltage coils as previously explained in connection with the high voltage winding 30.

In summary, the principles of the disclosed winding and insulation construction may be applied to the insulation between the windings of an electrical inductive apparatus, to the insulation between said windings and the magnetic core structure of such apparatus or to the insulation between the coils which make up the windings of an electrical inductive apparatus, such as a transformer. The winding and insulation structures disclosed have been found to provide a more efficient use of insulating material in inductive apparatus of the type described while providing more efficient cooling of the apparatus in order to carry off the heat which results from the various types of losses present during the operation of such apparatus. As explained previously, the presence of the cooling ducts or passageways in the various winding and insulation structures disclosed permits the removal of moisture from the solid insulation employed in the various constructions to decrease the corresponding dielectric losses in such solid insulation and to increase the effective dielectric strength of such solid insulation after it is assembled with the associated windings and magnetic cores.

It is to be understood that in certain applications the solid insulation disposed in the space between the different windings as described or between the coils which make up such windings may be molded or cast as larger insulating pieces or members rather than forming the solid insulation from a plurality of relatively thin layers or sheets of solid insulaiton. It is also to be understood that the coils which make up a low voltage winding in a particular application employing the teachings of the invention may be arranged similarly to the coils which make up the high voltage winding 30 or 200, as described, with the connected ends of the coils disposed closer together and the unconnected ends or sides disposed farther apart in accordance with the difference in potential which results from such interconnections.

The apparatus embodying the teachings of this invention has several advantages. For example, the more efficient cooling which results from the internally disposed ducts in the coils of the windings as described is obtained, while also providing more efficient cooling in the insulation provided between either the windings of an electrical inductive apparatus or between the coils of an inductive apparatus as described. In addition, the maximum voltage or potential stress which results in a winding and insulation construction of the different embodiments described is reduced to thereby provide a reduced maximum potential or voltage stress throughout the winding and insulation structures and to provide a more uniform voltage or potential gradient between the high voltage coils and the associated low voltage windings or magnetic core structure. Voltage or potential stresses will also be reduced at points where discontinuities are introduced between different types of insulation where one type of insulation is terminated and another is introduced. Finally, the dielectric strength of solid insulation employed in winding and insulation structures as disclosed may be more readily increased and the corresponding dielectric losses reduced by vacuum treating of the solid insulation after it is fitted and assembled in the manner disclosed.

Since numerous changes may be made in the above described apparatus and different embodiments of the invention may be made without departing from the spirit and scope thereof, it is intended that all of the matter contained in the foregoing description or shown in the accompanying drawings shall be interpreted as illustrative and not in a limiting sense.

I claim as my invention:

1. A transformer comprising a casing, magnetic core disposed in said casing, a dielectric cooling medium disposed in said casing, first and second windings of different voltage ratings disposed on said core in spaced relation, said first winding comprising a plurality of coils spaced apart from and interconnected with one another, each of said coils comprising a plurality of layers of spirally wound conductors connected in parallel circuit relation and spaced apart from one another to provide cooling passageways therebetween in close bontact with said conductor layers, a plurality of layers of substantially solid insulation disposed in areas between said coils and between said windings, the voltage stress between said windings being non-uniform across the areas therebetween when a potential is applied to said first winding, and one or more passageways disposed to pass between the layers of solid insulation in the space between said windings in the areas of lower voltage stress to permit the flow of the cooling medium therethrough and to reduce the maximum voltage stress in the space between said windings.

2. A transformer comprising a casing, a magnetic core disposed in said casing, a dielectric cooling medium disposed in said casing, first and second windings of different voltage ratings disposed on said core in spaced relation, said first winding comprising a plurality of coils spaced apart from and interconnected with one another, each of said coils comprising a plurality of layers of spirally wound conductors connected in parallel circuit relation and spaced apart from one another to provide cooling passageways therebetween in close contact with said conductor layers, a plurality of layers of substantially solid insulation disposed in areas between said coils and between said windings, the voltage stress between said windings being non-uniform across the areas therebetween when a potential is applied to said first winding, and one or more passageways disposed between the layers of solid insulation in the space between said windings relatively closer to one of said windings in the areas of lower voltage stress to permit the flow of the cooling medium therethrough and to reduce the maximum voltage stress in the space between said windings, the specific inductive capacitance of said cooling medium being less than that of said solid insulation.

3. A transformer comprising a casing, a magnetic core disposed in said casing, a dielectric cooling medium disposed in said casing, first and second windings of different voltage ratings disposed on said core in spaced relation, said first winding comprising a plurality of coils spaced from and interconnected with one another, each of said coils comprising a plurality of layers of spirally wound conductors connected in parallel circuit relation and spaced apart from one another to provide cooling passageways therebetween in close contact with said conductor layers, substantially solid insulation disposed in areas between said coils and between said windings, the voltage stress between said windings being non-uniform across the areas therebetween when a potential is applied to said first winding, and one or more passageways disposed to pass through said solid insulation in the space between said windings in the areas of lower voltage stress to permit the flow of the cooling medium therethrough and to reduce the maximum voltage stress in the space between said windings.

4. A transformer comprising a magnetic core, a high voltage winding disposed on said core, said winding comprising a plurality of pancake type coils spaced from one another and interconnected in circuit relation with one another, each of said coils including a plurality of spirally wound conductors spaced apart from one another to form cooling ducts therebetween in close contact with said conductors and connected in parallel circuit relation with one another, the voltage stress in regions between said coils being non-uniform when a potential is applied to said winding, substantially solid insulation disposed between said coils in the regions of maximum voltage stress when a potential is applied to said winding, and one or more cooling ducts disposed to pass through said solid insulation in the spaces between adjacent coils in the regions of lower voltage stress when a potential is applied to said winding to permit the passage of a dielectric cooling fluid therethrough to reduce the maximum voltage stress in the spaces between said coils.

5. A transformer comprising a magnetic core, a high voltage winding disposed on said core, said winding comprising a plurality of pancake type coils spaced from one another and interconnected in circuit relation with one another, each of said coils including a plurality of spirally wound conductors spaced apart from one another to form cooling ducts therebetween in close contact with said conductors and connected in parallel circuit relation with one another, the voltage stress in regions between said coils being non-uniform when a potential is applied to said winding, substantially solid insulation disposed between said coils in the regions of maximum voltage stress when a potential is applied to said winding, one or more cooling ducts disposed to pass through said solid insulation in the spaces between adjacent coils in the regions of lower voltage stress when a potential is applied to said winding to permit the passage of a dielectric cooling fluid therethrough, and a cooling fluid disposed in said ducts, the specific inductive capacitance of said fluid being less than that of said solid insulation thereby reducing the maximum voltage stress in the spaces between adjacent coils.

6. A transformer comprising a magnetic core, a high voltage winding disposed on said core, said winding comprising a plurality of pancake type coils spaced from one another and interconnected in circuit relation with one another, each of said coils including a plurality of spirally wound conductors spaced apart from one another to form cooling ducts therebetween in close contact with said conductors and connected in parallel circuit relation with one another, the voltage stress in regions between said coils being non-uniform when a potential is applied to said winding, substantially solid insulation disposed between said coils in the regions of maximum voltage stress when a potential is applied to said winding, and a plurality of cooling ducts disposed to pass through said solid insulation in the spaces between adjacent coils in the regions of lower voltage stress when a potential is applied to said winding to permit the passage of a dielectric cooling fluid therethrough and to reduce the maximum voltage stress in the spaces between said coils, said cooling ducts comprising a plurality of alternate relatively thin layers of solid insulation and relatively thin substantially parallel passageways therebetween.

7. A transformer comprising a casing, a magnetic core disposed in said casing, a dielectric cooling fluid disposed in said casing, first and second windings of different voltage ratings disposed on said magnetic core and spaced apart from one another, said first winding comprising a plurality of interconnected coils spaced apart from one another, said coils each including a plurality of substantially parallel layers of spirally wound conductors spaced apart from one another to form cooling ducts therebetween in close contact with said conductor layers and connected in parallel circuit relation with one another, substantially solid insulation disposed between said coils and between said windings, the voltage stress in regions between said windings being non-uniform when a potential is applied to one of said windings, and a plurality of passageways disposed in the space between said windings in the regions of lower voltage stress to pass through said solid insulation to permit the flow of said cooling fluid therethrough, said passageways being disposed relatively closer to one of said windings.

8. A transformer comprising a casing, a magnetic core disposed in said casing, a dielectric cooling fluid disposed in said casing, first and second windings of different voltage ratings disposed on said magnetic core and spaced apart from one another, said first winding comprising a plurality of interconnected coils spaced apart from one another, said coils each including a plurality of substantially parallel layers of spirally wound conductors spaced apart from one another to form cooling ducts therebetween in close contact with said conductor layers and connected in parallel circuit relation with one another, a plurality of layers of substantially solid insulation disposed between said coils and between said windings, the meeting ends of said layers of said solid insulation being oppositely beveled to substantially eliminate voids, the voltage stress in regions between said windings being non-uniform when a potential is applied to one of said windings, and a plurality of passageways disposed in the space between said windings in the regions of lower voltage stress to pass through said solid insulation to permit the flow of said cooling fluid therethrough to carry off the heat which results from the dielectric losses in said solid insulation at high operating potentials, the specific inductive capacitance of said cooling fluid being less than that of said solid insulation thereby reducing the maximum voltage stress in the space between said windings.

9. A transformer comprising a casing, a magnetic core disposed in said casing, a dielectric cooling fluid disposed in said casing, first and second windings of different voltage ratings disposed on said magnetic core and spaced apart from one another, said first winding comprising a plurality of interconnected coils spaced apart from one another, said coils each including a plurality of substantially parallel layers of spirally wound conductors spaced apart from one another to form cooling ducts therebetween in close contact with said conductor layers and connected in parallel circuit relation with one another, substantially solid insulation disposed between said coils, between said windings and between said windings and said core, the voltage stress in regions between said windings being non-uniform when a potential is applied to one of said windings, and a plurality of passageways disposed in the space between said windings and between said windings and said core in the regions of lower voltage stress to pass through said solid insulation to permit the flow of said cooling fluid therethrough.

10. A transformer comprising a casing, a magnetic core disposed in said casing, a dielectric cooling fluid disposed in said casing, first and second windings of different voltage ratings disposed on said magnetic core and spaced apart from one another, said first winding comprising a plurality of interconnected coils spaced apart from one another, said coils each including a plurality of substantially parallel layers of spirally wound conductors spaced apart from one another to form cooling ducts therebetween in close contact with said conductor layers and connected in parallel circuit relation with one another, a plurality of layers of substantially solid insulation disposed between said coils and between said windings, the voltage stress in regions between said windings being non-uniform when a potential is applied to one of said windings, and a plurality of passageways disposed in the space between said windings in the regions of lower voltage stress to pass through said solid insulation to permit the flow of said cooling fluid therethrough, said passageways comprising a plurality of alternate relatively thin layers of solid insulation and relatively thin substantially parallel cooling ducts therebetween in which said fluid is disposed.

11. A transformer comprising a magnetic core, a high voltage winding disposed on said core, said winding comprising a plurality of pancake type coils spaced from one another and interconnected in circuit relation with one another, each of said coils including a plurality of spirally wound conductors spaced apart from one another to form cooling ducts therebetween in close contact with said conductors and connected in parallel circuit relation with one another, the voltage stress in regions between said coils being non-uniform when a potential is applied to said winding, substantially solid insulation disposed between said coils in the regions of maximum voltage stress when a potential is applied to said winding, a plurality of cooling ducts disposed to pass through said solid insulation in the spaces between adjacent coils in the regions of lower voltage stress when a potential is applied to said winding to permit the passage of a dielectric cooling fluid therethrough and to reduce the maximum voltage stress in the spaces between said coils, said cooling ducts comprising a plurality of alternate relatively thin layers of solid insulation and relatively thin substantially parallel passageways therebetween, and a plurality of spacers disposed between said relatively thin layers of solid insulation to maintain said layers in spaced relationship.

12. A transformer comprising a casing, a magnetic core disposed in said casing, a dielectric cooling fluid disposed in said casing, high voltage and low voltage windings disposed on said magnetic core and spaced apart from one another, said high voltage winding comprising a plurality of interconnected coils spaced apart from one another, said coils each including a plurality of substantially parallel layers of spirally wound conductors spaced apart from one another to form cooling ducts therebetween in close contact with said conductor layers and connected in parallel circuit relation with one another, a plurality of layers of substantially solid insulation disposed between said coils and between said windings, the voltage stress in regions between said windings being non-uniform when a potential is applied to one of said windings, and a plurality of passageways disposed in the space between said windings in the regions of lower voltage stress to pass through said solid insulation to permit the flow of said cooling fluid therethrough, said passageways being disposed in the space between said windings relatively closer to said low voltage winding and comprising a plurality of alternate relatively thin layers of solid insulation and relatively thin substantially parallel cooling ducts therebetween in which said fluid is disposed.

13. A transformer comprising a magnetic core, a high voltage winding and a low voltage winding disposed on said core, said high voltage winding comprising a plurality of pancake type coils spaced from one another and interconnected in circuit relation with one another, each of said coils including a plurality of spirally wound conductors spaced apart from one another to form cooling ducts therebetween in close contact with said conductors and connected in parallel circuit relation with one another, the voltage stress in regions between said coils being non-uniform when a potential is applied to the high voltage winding, substantially solid insulation disposed between said coils in the regions of maximum voltage stress when a potential is applied to said high voltage winding, one or more cooling ducts disposed to pass through said solid insulation in the spaces between adjacent coils in the regions of lower voltage stress when a potential is applied to said winding to permit the passage of a dielectric cooling fluid therethrough, the thickness of each of said ducts being in the order of $\frac{1}{16}$ of an inch to $\frac{1}{2}$ inch, and a cooling fluid disposed in said ducts, the specific inductive capacitance of said fluid being less than that of said solid insulation thereby reducing the maximum voltage stress in the spaces between adjacent coils.

14. A transformer comprising a casing, a magnetic core disposed in said casing, a dielectric cooling fluid disposed in said casing, a high voltage winding and a low voltage winding disposed on said core and spaced apart from one another, said high voltage winding comprising a plurality of interconnected coils spaced apart from one another, said coils each including a plurality of substantially parallel layers of spirally wound conductors spaced apart from one another and connected in parallel circuit relation with one another, substantially solid insulation disposed between said coils, between said windings, and between said windings and said core, the voltage stress in regions between said windings and between said windings and said core being non-uniform when a potential is applied to one of said windings, and a plurality of passageways disposed in the space between said windings and between said windings and said core in the regions of lower voltage stress to pass through said solid insulation to permit the flow of said fluid therethrough and to reduce the maximum voltage stress in said space, said passageways being disposed relatively closer to said low voltage winding and to said core.

15. A transformer comprising a casing, a magnetic core disposed in said casing, a dielectric cooling fluid disposed in said casing, a high voltage winding and a low voltage winding disposed on said core and spaced apart from one another, said high voltage winding comprising a plurality of interconnected coils spaced apart from one another, said coils each including a plurality of substantially parallel layers of spirally wound conductors spaced apart from one another and connected in parallel circuit relation with one another, the unconnected portions of said coils being spaced farther apart and the connected portions of said coils being spaced relatively closer together, substantially solid insulation disposed between said coils, between said windings, and between said windings and said core, the voltage stress in regions between said windings and between said windings and said core being non-uniform when a potential is applied to one of said windings, and a plurality of passageways disposed in the space between said coils between said windings and between said windings and said core in the regions of lower voltage stress to pass through said solid insulation to permit the flow of said fluid therethrough and to reduce the maximum voltage stress in said space, said passageways being disposed relatively closer to said low voltage winding and to said core, the thickness of the passageways between said coils being tapered in cross section.

References Cited by the Examiner

UNITED STATES PATENTS

| | | | |
|---|---|---|---|
| Re. 14,891 | 6/20 | Johannesen | 336—60 |
| 2,993,183 | 7/61 | Moore et al. | 336—70 X |

JOHN F. BURNS, *Primary Examiner.*

MILTON O. HIRSHFIELD, *Examiner.*